(12) United States Patent
Grenier et al.

(10) Patent No.: US 6,870,682 B1
(45) Date of Patent: Mar. 22, 2005

(54) APPARATUS FOR RESHAPING AN OPTICAL BEAM BUNDLE

(75) Inventors: Paul Grenier, Sainte-Foy (CA); Yves Taillon, Saint-Augustin-de-Desmaures (CA)

(73) Assignee: Institut National d'Optique, Sainte-Fory (CA)

( * ) Notice: Subject to any disclaimer, the term of this patent is extended or adjusted under 35 U.S.C. 154(b) by 0 days.

(21) Appl. No.: 10/673,355

(22) Filed: Sep. 30, 2003

(51) Int. Cl.$^7$ .............................. G02B 27/10; F21V 3/04
(52) U.S. Cl. ........................................ 359/627; 362/259
(58) Field of Search ................................ 359/618, 624, 359/625, 627, 636, 640, 641, 668; 362/259; 372/100

(56) References Cited

U.S. PATENT DOCUMENTS

| | | | |
|---|---|---|---|
| 5,155,623 A | 10/1992 | Miller et al. | ................. 359/495 |
| 5,808,323 A | 9/1998 | Spaeth et al. | ................. 257/88 |
| 6,504,650 B1 | 1/2003 | Alfrey | ........................ 359/627 |

OTHER PUBLICATIONS

Faircloth, Brian, "High-brightness high-power fiber coupled diode laser system for material processing and laser pumping", Proceedings of SPIE vol. 4973 (2003), pp. 34–41.

*Primary Examiner*—David N. Spector (57) ABSTRACT

Apparatus for shaping an optical beam bundle carrying a plurality of substantially parallel optical beams disposed in a common plane of travel. First reflective facets and second reflective facets are provided, the first reflective facets being oriented so as to deflect the optical beams of the bundle into a plurality of intermediate, substantially non-parallel optical beams. Each of the second reflective facets is spatially disposed so as to receive a respective one of the intermediate optical beams at a different respective distance from the plane of travel of the optical beam bundle. Also, the second reflective facets are oriented so as to deflect the intermediate optical beams into a bundle of substantially parallel output optical beams. In this way, the output beam can be more adapted for a particular application. In certain cases, this also achieves increased brightness of a laser beam through reduced output beam divergence and/or total cross-sectional area.

49 Claims, 7 Drawing Sheets

APPARATUS FOR RESHAPING AN OPTICAL BEAM BUNDLE

FIELD OF THE INVENTION

The present invention relates generally to optical devices and components and, more particularly, to optical devices and components for reshaping bundles or arrays of optical beams.

BACKGROUND OF THE INVENTION

In recent years, laser diode systems such as laser diode bars have been in use in various applications such as machining of materials, treatment of surfaces, and illumination and pumping of solid-state lasers. These various applications have different requirements on the laser beam characteristics, such as the beam shape, brightness and divergence. One major difficulty in using laser diode bars and other systems is that the unconditioned output laser beam is rarely adapted for the particular application. Another problem is that the laser beam most often suffers from a lack of brightness. Therefore, laser beam conditioning and/or reshaping is required in order to optimize the output laser beam characteristics.

SUMMARY OF THE INVENTION

According to a first broad aspect, the present invention seeks to provide an apparatus for shaping a first optical beam bundle into a second optical beam bundle, where the first optical beam bundle carries a first plurality of substantially parallel optical beams disposed in a common plane of travel. The apparatus comprises a plurality of first reflective facets and a plurality of second reflective facets. The first reflective facets are oriented so as to deflect the optical beams of the first optical beam bundle into a plurality of intermediate, substantially non-parallel optical beams. Each of the second reflective facets is spatially disposed so as to receive a respective one of the intermediate optical beams at a different respective distance from the plane of travel of the optical beams of the first optical beam bundle. Moreover, the second reflective facets are oriented so as to deflect the intermediate optical beams into a second plurality of substantially parallel optical beams, thereby to form the second optical beam bundle.

In this way, the second optical beam bundle can be more adapted for a particular application. In certain cases, this also achieves increased brightness of a laser beam through reduced output beam divergence and/or total cross-sectional area.

According to a second broad aspect, the present invention seeks to provide an apparatus for shaping a first optical beam bundle into a second optical beam bundle, where the first optical beam bundle carries a plurality of sets of substantially parallel optical beams, wherein the optical beams of each of the sets of optical beams of the first optical beam bundle are commonly disposed in a corresponding one of a plurality of substantially parallel planes of travel. The apparatus comprises a plurality of sets of first reflective facets and a plurality of second reflective facets. The first reflective facets in each set of first reflective facets are oriented so as to deflect the optical beams of a corresponding one of the sets of optical beams of the first optical beam bundle into a corresponding set of intermediate, substantially non-parallel optical beams. Each of the second reflective facets is spatially disposed so as to receive a respective one of the intermediate optical beams at a different respective distance from the planes of travel of the optical beams of the first optical beam bundle. Moreover, the second reflective facets are oriented so as to deflect the intermediate optical beams into a second plurality of substantially parallel optical beams, thereby to form the second optical beam bundle.

According to a third broad aspect, the present invention seeks to provide an apparatus, comprising an optical source adapted to emit a plurality of optical beams substantially in a z-direction of an x-y-z orthogonal reference system and parallel to an x-z plane of the orthogonal reference system, as well as a mirror configuration disposed at a position in the z-direction so as to receive the optical beams emitted by the optical source. The mirror configuration comprises a plurality of first reflective facets and a plurality of second reflective facets. The first reflective facets are oriented so as to deflect the optical beams received from the optical source into a plurality of intermediate, substantially non-parallel optical beams. Each of the second reflective facets is spatially disposed so as to receive a respective one of the intermediate optical beams at a different position in the y-direction of the orthogonal reference system. Moreover, the second reflective facets are oriented so as to deflect the intermediate optical beams into an outgoing plurality of substantially parallel optical beams.

According to a fourth broad aspect, the present invention seeks to provide a method for shaping a first optical beam bundle into a second optical beam bundle, the first optical beam bundle carrying a first plurality of substantially parallel optical beams disposed in a common plane of travel. The method comprises deflecting the optical beams of the first optical beam bundle into a plurality of intermediate, substantially non-parallel optical beams; intercepting each of the intermediate optical beams at a different respective distance from the plane of travel of the optical beams of the first optical beam bundle; and deflecting the intermediate optical beams into a second plurality of substantially parallel optical beams, thereby to form the second optical beam bundle.

According to a fifth broad aspect, the present invention seeks to provide an apparatus, comprising a source of first optical beams travelling in a common first direction parallel to an x-z plane of an x-y-z orthogonal reference system and occupying a plurality of first positions in a y-direction of the orthogonal reference system, as well as a source of second optical beams travelling in a common second direction parallel to the x-z plane and occupying a plurality of second positions in the y-direction, the first and second directions being non-collinear. The first positions in the y-direction are different from the second positions in the y-direction. The apparatus further comprises a mirror configuration, comprising a first reflective area for deflecting the first optical beams into a third direction parallel to the x-z plane and different from the first and second directions and a second reflective area for deflecting the second optical beams into the third direction.

According to a sixth broad aspect, the present invention seeks to provide an apparatus, comprising a source of first optical beams travelling in a common first direction parallel to an x-z plane of an x-y-z orthogonal reference system and occupying a plurality of first positions in a y-direction of the orthogonal reference system, as well as a source of second optical beams travelling in a common second direction parallel to the x-z plane and occupying a plurality of second positions in the y-direction, the first direction being perpendicular to the second direction. The first positions in the y-direction are different from the second positions in the y-direction. The apparatus further comprises an optical device, comprising a plurality of reflective facets for deflecting the first optical beams into the second direction such that the deflected first optical beams continue to occupy the first positions in the y-direction. Moreover, the optical device is configured to allow through passage of the second optical beams such that the second optical beams continue to travel in the second direction and continue to occupy the second positions in the y-direction.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1A:
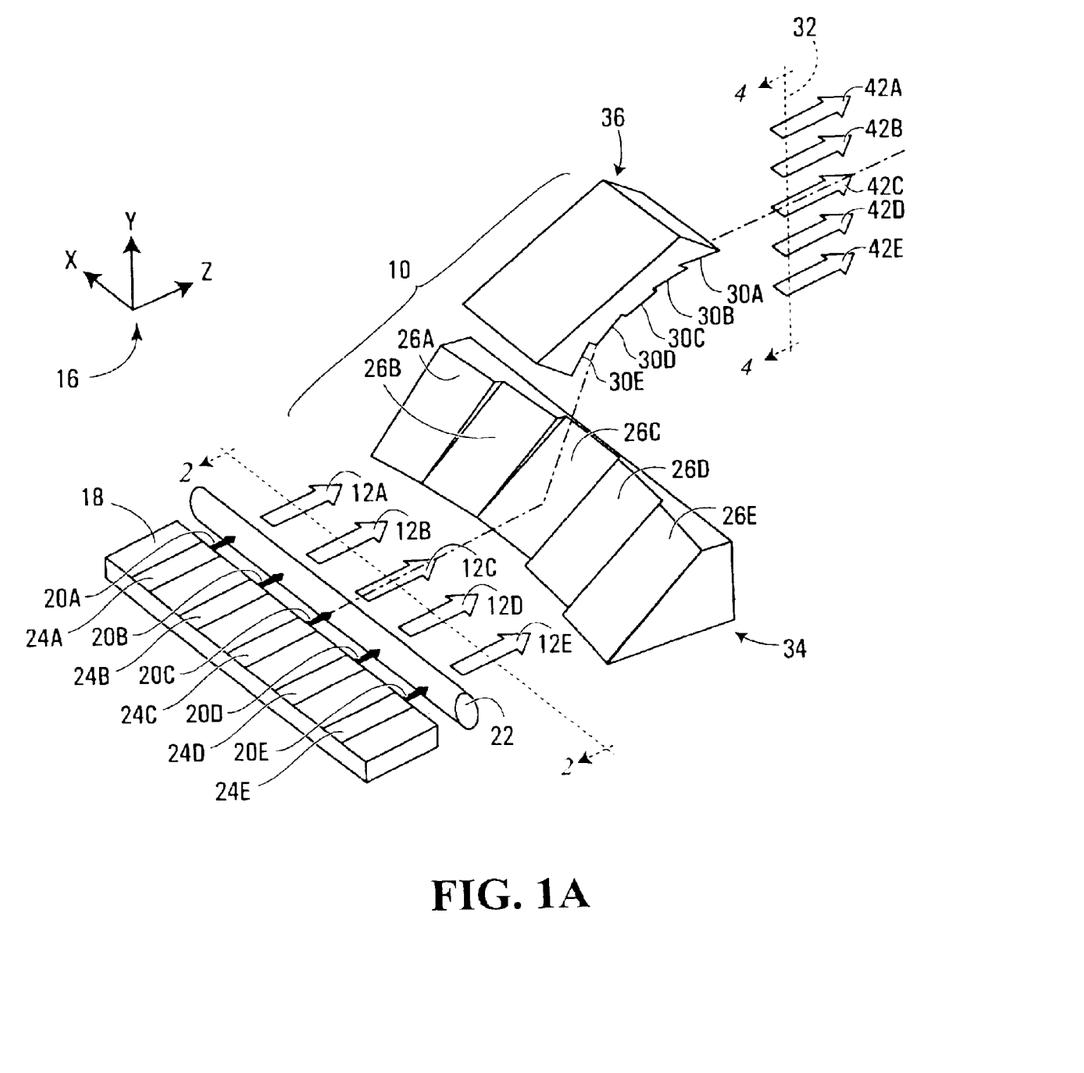
FIG. 1A is a perspective view of a mirror configuration for reshaping a bundle of input optical beams into a bundle of output optical beams, in accordance with an embodiment of the present invention.

In FIGS. 1A through 7B, a three-dimensional orthogonal reference system 16 with three directions (axes) x, y and z has been defined for the purposes of convenience. As seen in FIG. 1A, an optical emitter 18 (e.g., a laser diode bar) emits a plurality of beamlets 20a–e travelling generally in the z-direction of the orthogonal reference system 16, within a common x-z plane. In different embodiments, the beamlets 20a–e may all have the same wavelength, or they may each have different wavelengths, or they may each occupy a range of wavelengths.

Despite travelling generally in the z-direction, the beamlets 20a–e emitted by the emitter 18 are typically divergent in the y-direction and also, although somewhat less strongly, in the x-direction. Accordingly, beam-collimating optics 22 may be provided for reducing the divergence of the plurality of beamlets 20a–e, resulting in the creation of respective input optical beams 12a–e forming part of an input optical beam bundle. Together, the emitter 18 and the beam-collimating optics 22 may be referred to as a "source" of the input optical beam bundle. It should be appreciated that although the number of optical beams 12a–e in the input optical beam bundle is illustrated as being five (5), this should be taken as an example only and not as a limitation of the present invention, which is applicable to any number of optical beams.

In general, the bean-collimating optics 22 can be used to correct for divergence in any combination of the x- and y-directions to the extent required by the application. By way of non-limiting example, the beam-collimating optics 22 may comprise a collimator (e.g., cylindrical microlens), a diffraction grating or an appropriately curved mirror (parabolic, spherical, aspherical). Thus, the effect of the beam-collimating optics 22 is to reduce some of the divergence of the beamlets 20a–e in the x- and y-directions. Upon leaving the beam-collimating optics 22, the input optical beams 12a–e continue to travel in the z-direction, generally within a common x-z plane. It is noted that divergence along the x- and y-directions may still occur, although to a lesser extent than in the absence of the beam-collimating optics 22.

Figure 2:
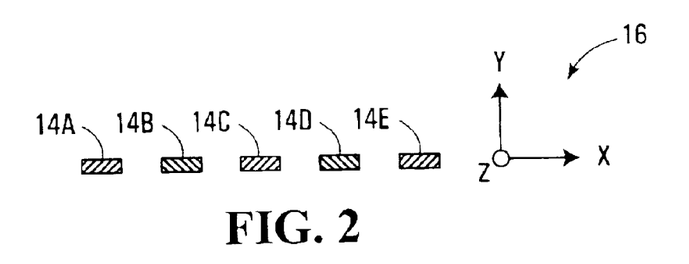
FIG. 2 is a sectional view of the input optical beams in FIG. 1A, taken along the line 2—2.
Figure 3:
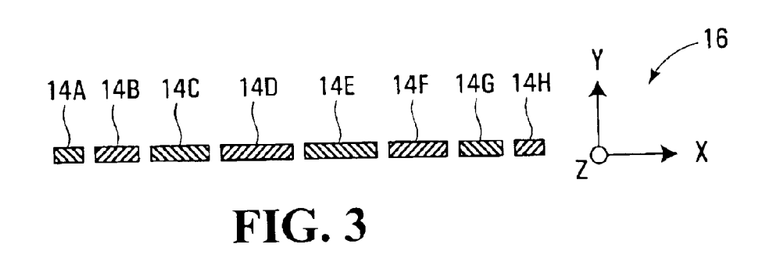
FIG. 3 is a sectional view of a bundle of alternative input optical beams, if taken along the line 2—2 in FIG. 1A.

In the illustrated embodiment, the emitter 18 comprises a plurality of discrete emitting areas 24a–e, each having a substantially identical cross-sectional width in the x-direction and producing a respective one of the beamlets 20a–e which results in a respective one of the input optical beams 12a–e after passing through the beam-collimating optics 22. This situation is illustrated in FIG. 2, where each of the input optical beams 12a–e in the input optical beam bundle is seen to have a substantially identical cross-sectional pattern 14a–e, with the same cross-sectional width in the x-direction. Of course, this need not be the case in all embodiments. For example, the laser diode bar 18 may have emitting areas of variable width, which causes the beamlets 20a–e to have varying widths and correspondingly imparts different widths to the various input optical beams 12a–e, as shown in FIG. 3 at 14a–h.

In still other embodiments, the emitter 18 may comprise a large number of closely-spaced (in the x-direction) emitting areas each having a relatively narrow cross-section, thus giving the illusion of a single, contiguous emitting area. In such an embodiment, multiple closely-spaced beamlets emitted from the emitting area will give the illusion of a single, wide contiguous beamlet. An arrangement of mirrors can then be used to partition the closely-spaced beamlets so as to produce a plurality of input optical beams having desired cross-sectional widths, again as shown in FIG. 3 at 14a–h. Thus, it should be appreciated that more than one beamlet may combine to form a common one of the input optical beams.

It will be noted that when coherency of individual ones of the input optical beams 12a–e is of importance, then it is advantageous to maintain a one-to-one correspondence between the emitting areas 24a–e (beamlets 20a–e) and the input optical beams 12a–e, whereas when such coherency is not important, then two or more emitting areas 24a–e (beamlets 20a–e) can be combined to form a single one of the input optical beams 12a–e. Furthermore, although not shown in FIGS. 2 and 3, it should also be appreciated that producing emitting areas 24a–e with different "heights" (i.e., expanse in the y-direction) is within the scope of the present invention.

Figure 1B:
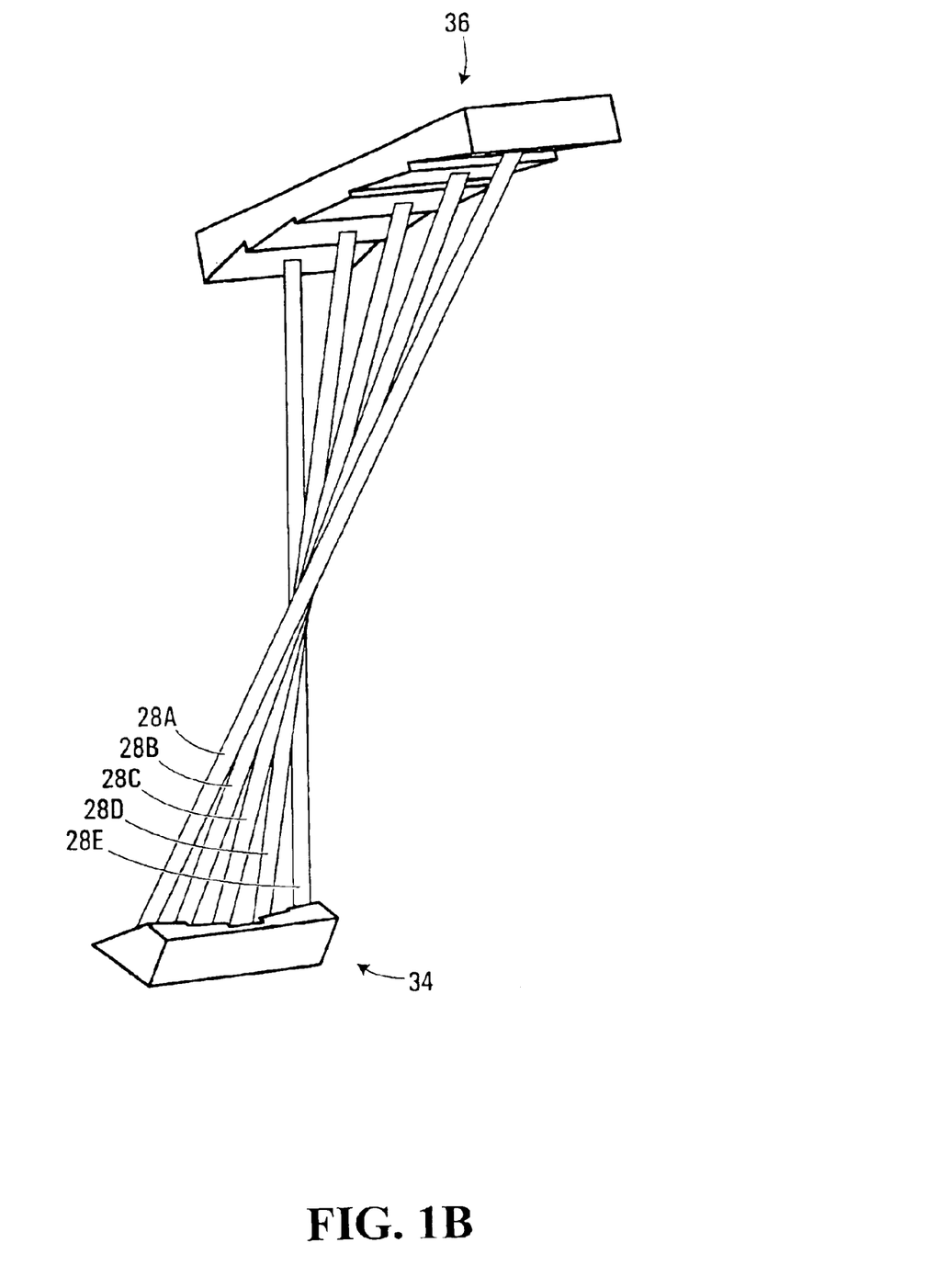
FIG. 1B is a perspective view of the paths taken by the input optical beams in FIG. 1A as they travel within the mirror configuration.

Continuing with the description of FIG. 1A, a plurality of first reflective facets 26a–e is positioned along the z-direction, at a point preferably prior to intersection (i.e., overlap) of any pair of adjacent input optical beams 12a–e due to divergence in the x-direction. The first reflective facets 26a–e form part of the mirror configuration 10 in accordance with an embodiment of the present invention. The first reflective facets 26 are oriented so as to deflect the input optical beams 12a–e (which run parallel to one another) into a plurality of intermediate, substantially non-parallel optical beams 28a–e, as best seen in FIG. 1B.

Each of the intermediate optical beams 28a–e travels towards a corresponding one of a plurality of second reflective facets 30a–e. It is noted that each of the second reflective facets 30a–e is spatially disposed so as to receive a corresponding one of the intermediate optical beams 28a–e at a different position in the y-direction of the orthogonal reference system 16, i.e., at a different distance (perceived as a "height" in FIG. 1A) from the x-z plane. In addition, the second reflective facets 30a–e are oriented such that deflection of the intermediate optical beams 28a–e results in a substantially parallel set of output optical beams 42a–e, forming what is hereinafter referred to as an output optical beam bundle.

Figure 4:
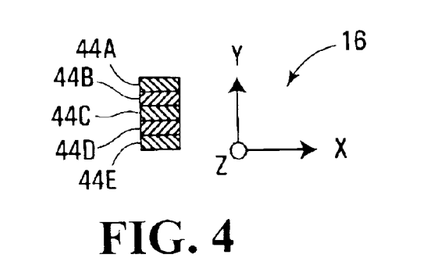
FIG. 4 is a sectional view of the output optical beams in FIG. 1A, taken along the line 4—4.
Figure 5:
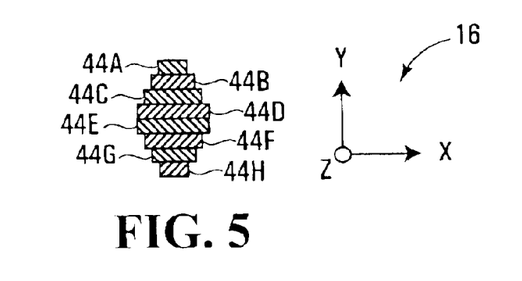
FIG. 5 is a sectional view of an output optical beam resulting from reshaping the alternative input optical beams, if taken along the line 4—4 in FIG. 1A.

In a specific embodiment, the second reflective facets 30a–e are spatially disposed so as to cause the output optical beams 42a–e to be aligned along an imaginary line 32 that is normal to the x-z plane, i.e., orthogonal to the plane of travel of the input optical beams 12a–e. An example of the cross-section of the bundle of output optical beams 42a–e in such a configuration is shown in FIG. 4 for the case where the input optical beam bundle 12a–e has the cross-sectional configuration of FIG. 2 (i.e., the emitting areas 24a–e, the beamlets 20a–e and input optical beams 12a–e have identical widths). In another embodiment, such as where the emitting areas 24a–e and/or beamlets 20a–e and/or input optical beams 12a–e have differing cross-sectional widths (see FIG. 3), an example of the resulting cross-sectional configuration of the output optical beams 42a–h is shown in FIG. 5. Here, it is seen that the output optical beam bundle has a cross-section that resembles more closely a circular cross section.

Generally speaking, the mirror configuration 10 allows the cross-sectional patterns of the optical beams 12a–e, 42a–e in the input and output optical beam bundles, respectively, to have differing shapes and degrees of compactness. In particular, the mirror configuration allows the optical beams 42a–e in the output optical beam bundle to take on a shape that is more suitable for a particular application than the shape of the optical beams 12a–e in the input optical beam bundle. In certain cases, it can also permit an increase in the laser beam brightness by a reduced output beam divergence and/or total cross-sectional area. For example, the output optical beams 42a–e in the output optical beam bundle can collectively be made to have a more compact cross-section than the input optical beams 12a–e in the input optical beam bundle, hence making the output optical beam bundle brighter and more suitable for feeding into an optical fiber having a circular cross-section. Also, in the case of surface/materials treatment, the cross-sectional shape of the output optical beams may need to be tailored to the piece being treated.

It will thus be apparent that a variety of different cross-sectional patterns for the output optical beam bundle can be created and it will be a matter of routine for one of ordinary skill in the art to select the widths of the emitting areas 24a–e and the angles and relative distances of the first reflective facets 26a–e and the second reflective facets 30a–e in order to achieve the desired pattern.

In the embodiment illustrated in FIGS. 1A and 1B, the mirror configuration 10 is designed to cause the output optical beams 42a–e to travel in a common direction of travel (i.e., the z-direction), which is identical to the direction of travel of the input optical beams 12a–e.

However, this need not be the case, as the direction of the travel of the output optical beams 42a–e may differ from the direction of travel of the input optical beams 12a–e and may even be oblique to the x-z plane.

It will also be appreciated that the first reflective facets 26a–e and the second reflective facets 30a–e of the mirror configuration 10 may be constructed in various ways. For instance, the first reflective facets 26a–e can define the outer faces of a transparent substrate in the form of a monolithic base 34. Similarly, the second reflective facets 30a–e may define the outer surfaces of a second monolithic base 36, which may be integral with, or separate from, the monolithic base 34 containing the first reflective facets 26a–e. Thus, the mirror configuration 10 may be made compact, robust and well suited to low-cost and en masse production by molding techniques, for example.

Furthermore, by virtue of proper positioning and distancing of the first reflective facets 26ae and the second reflective facets 30a–e, the mirror configuration 10 can be made to exhibit the feature whereby a substantially identical distance (path length) is traveled by each of the input optical beams 12a–e as they travel from a first imaginary plane orthogonally intersecting the input optical beam bundle to a second imaginary plane orthogonally intersecting the output optical beam bundle. The second imaginary plane may contain the imaginary line 32, for example. A suitable setup of the first and second reflective facets 26a–e, 30a–e will thus serve to preserve coherency amongst the output optical beams 42a–e, in turn allowing all of the output optical beams 42a–e in the output optical beam bundle to be coherent, which may be advantageous in some applications.

In other embodiments, adequate coherency may be achieved by ensuring that a variability of no more than 1 mm occurs over each 40 mm of path length, or a variability of 2.5%. In embodiments where each of the input optical beams 12a–e has essentially the same wavelength, it may be desirable to ensure that the distances traveled by any two of the input optical beams 12a–e as they transit the mirror configuration 10 differ by an integral number (0, 1, 2, etc.) of laser wavelengths. Such constraints can be met by embodiments of the present invention because the input optical beams 12a–e that travel less prior to deflection by the first reflective facets 26a–e (i.e., those having a smaller component in the z-direction) can be made to travel a greater cumulative distance between the two sets of reflective facets and subsequent to reflection by the second reflective facets 30a–e. Similarly, the input optical beams 12a–e that travel further prior to deflection by the first reflective facets 26a–e (i.e., those having a greater component in the z-direction)

can be made to travel a shorter cumulative distance between the two sets of reflective facets and subsequent to reflection by the second reflective facets 30a–e. Thus, the mirror configuration 10 provides a form of equalization of the path lengths traveled by the various input optical beams 12a–e.

In a specific embodiment, the path length of individual beams as they transit the mirror configuration 10 is substantially preset during manufacture thereof. If the path length then needs to be fine tuned during use, one may rely on a variety of mechanisms for controllably adjusting the positions and angles of the first reflective facets 26a–e and the second reflective facets 30a–e. For example, a piezoelectric mechanism could be used for controllably translating the position of each of the first reflective facets 26a–e along the z-direction (i.e., the direction of travel of the input optical beams 12a–e). Generally, it is within the scope of the present invention to allow controllable positioning of the first reflective facets 26a–e and the second reflective facets 30a–e along respective axes of rotation and translation.

It should also be appreciated that the first reflective facets 26a–e may have a curvature in order to condition (e.g., focus or defocus) the input optical beams 12a–e. Similarly, the second reflective facets 30a–e may have a curvature in order to condition the intermediate optical beams 28a–e received from the first reflective facets 26a–e. The use of curved second reflective facets 30a–e is irrespective of whether a curvature is applied to the first reflective facets 26a–e. It should also be appreciated that the need for beam-collimating optics 22 can be obviated by the use of curved surfaces for the first reflective facets 26a–e.

Figure 6:
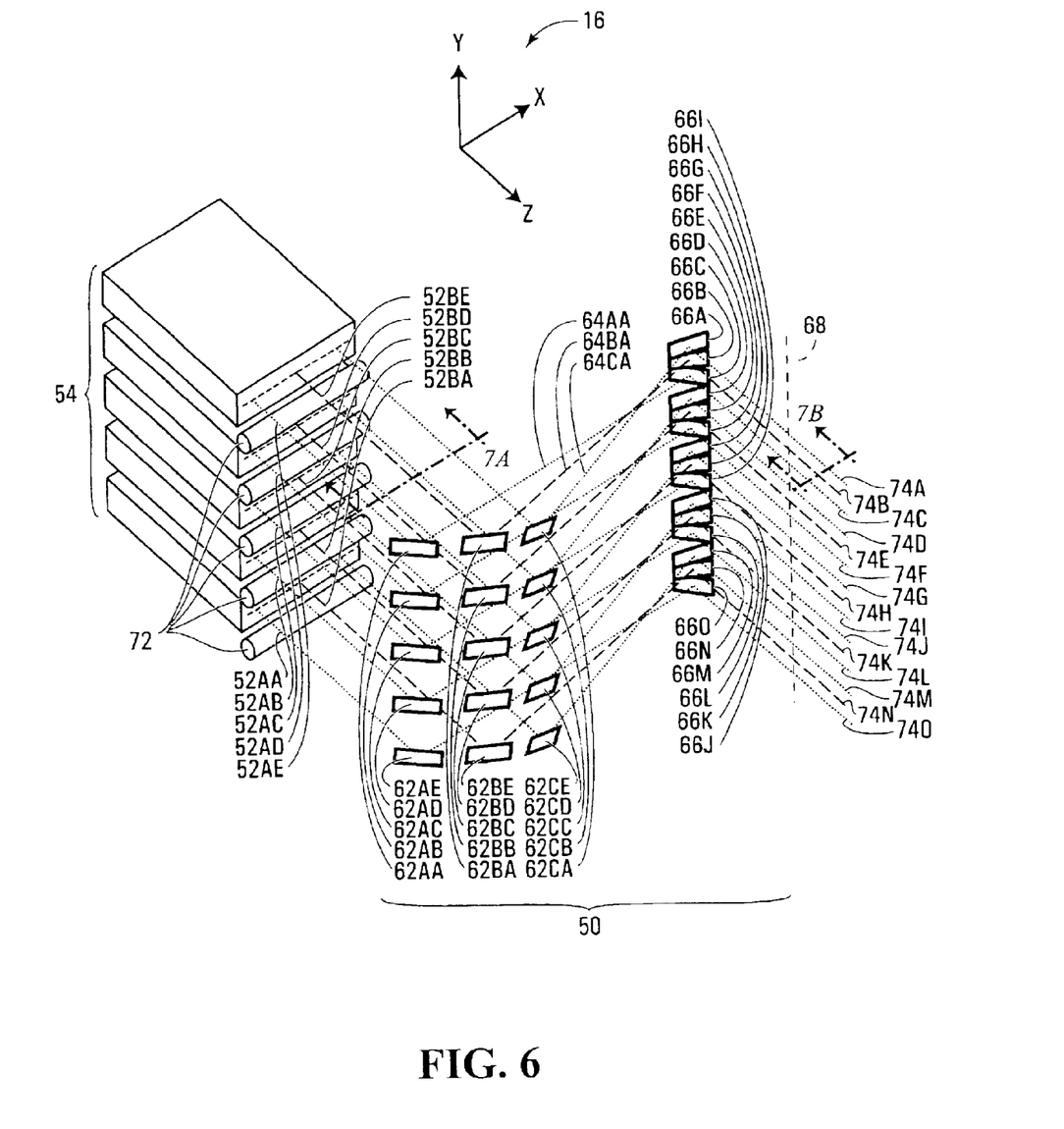
FIG. 6 is a perspective view of a mirror configuration for reshaping a bundle of input optical beams into a bundle of output optical beams, in accordance with an alternative embodiment of the present invention.

With reference now to FIG. 6, there is shown a further embodiment of the present invention, which provides a mirror configuration 50 for reshaping an input optical beam bundle containing a plurality of input optical beams 52aa, ab, . . . ,ae,ba,bb, . . . ,ba,ca,cb, . . . ,ce (collectively referred to as 52) into an output optical beam bundle containing a plurality of output optical beams 74a–o. In a non-limiting example application, the input optical beam bundle may originate from a laser diode array 54 constituted of a stack of laser diode bars.

Beam-collimating optics 72 may be provided for reducing the divergence of a plurality of originating beamlets, resulting in the creation of the input optical beams 52 forming part of the input optical beam bundle. Details of the beam-collimating optics 72 are similar to those previously described with respect to the beam-collimating optics 22 in FIG. 1A.

Figure 7A:
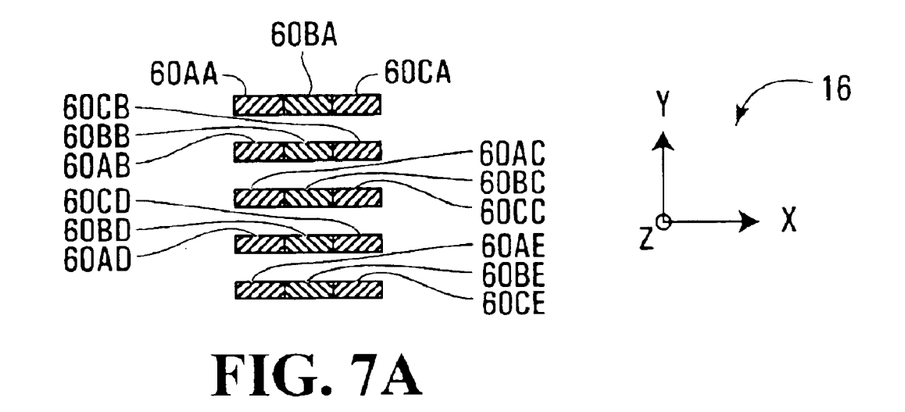
FIG. 7A is a sectional view of the input optical beams in FIG. 6, taken in the direction of arrow 7A.

The input optical beams 52 are substantially parallel to one another and travel in the z-direction (parallel to the x-z plane) of the orthogonal reference system 16. In cross-section, the input optical beams 52 have sectional elements 60aa,bb, . . . ,ae,ba,bb, . . . ,be,ca,cb, . . . ,ce (collectively referred to as 60), which can be said to define a matrix, as seen in FIG. 7A.

Each "row" of sectional elements 60 occupies a common position in the y-direction. Thus, each "row" of the input optical beams 60 defines its own plane parallel to the x-z plane and has its own position along the y-axis. In this case, the matrix has five (5) rows and three (3) columns, but it will be understood that the number of rows and columns in the matrix is arbitrary. Moreover, the sectional elements 60 may be staggered and there need not be alignment within any given row or column of the matrix.

The mirror configuration 50 comprises five rows and three columns of first reflective facets 62aa,ab, . . . ,ae,ba, bb, . . . ,be,ca,cb, . . . ,ce (collectively referred to as 62, with only the surfaces shown for clarity). The three reflective facets 62aa,ba,ca in the first "row" are oriented so as to deflect the three input optical beams 52ae,be,ce in a corresponding "row" of the input optical beams 52 into a corresponding set of three intermediate, substantially non-parallel optical beams 64aa,ba,ca. The same applies to the second, third, fourth and fifth "rows" of the first reflective facets 62, for a total of fifteen intermediate optical beams (collectively referred to as 64).

The mirror configuration 50 also comprises a plurality of second reflective facets 66a–o, which are not necessarily grouped into apparent sets. Nevertheless, each of the second reflective facets 66a–o corresponds to a respective one of the first reflective facets 62. Again, only the surfaces have been shown for clarity. Of note is the fact that each of the second reflective facets 66a–o is spatially disposed so as to receive a respective one of the intermediate optical beams 64 at a different respective distance from any of the planes of travel of any of the rows of input optical beams 52 in the input optical beam bundle. Moreover, the second reflective facets 66a–o are oriented so as to deflect the intermediate optical beams into a second plurality of substantially parallel output optical beams 74a–o, which forms the output optical beam bundle.

Figure 7B:
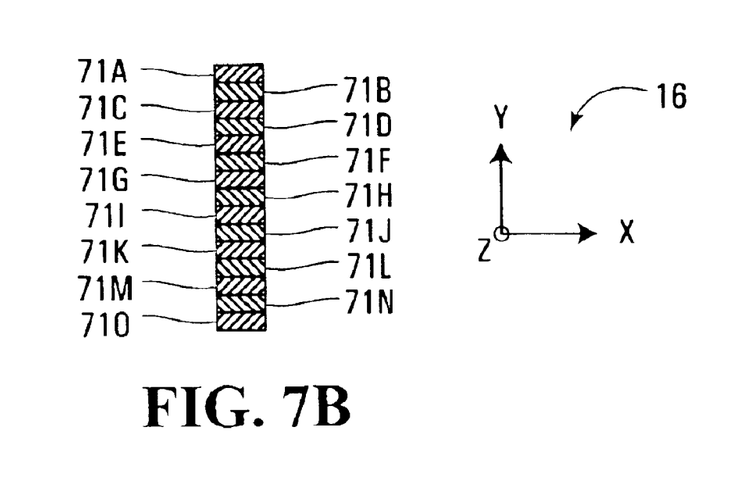
FIG. 7B is a sectional view of the output optical beams in FIG. 6, taken in the direction of arrow 7B.

Again, as with the embodiment of FIG. 1A, the second reflective facets 66a–o in the embodiment of FIG. 6 can be spatially disposed so as to cause the output optical beams 74a–o in the output optical beam bundle to be aligned along an imaginary line 68 that is normal to the x-z plane, i.e., normal to each of the planes of travel. The cross-sections of the output optical beams 74a–o in such an instance are shown in FIG. 7B at 71a–o for the case where the input optical beams 52 have the cross-sectional configuration of FIG. 7A and for the specific design of the mirror configuration 50 whereby the output optical beams 74a–o are aligned and contiguous along the imaginary line 68. It will be a matter of routine for one of ordinary skill in the art to select the angles and relative distances of the first reflective facets 62 and the second reflective facets 66a–o in order to achieve a variety of desired cross-sectional patterns for the output optical beam bundle 74.

In general, it will be apparent that whereas the cross-sections of the input optical beams 52 make up of a matrix of N rows and M columns, the cross-sections 71a–o of the output optical beams 74a–o can be made to constitute any configuration of N×M beam sections, not necessarily in the form of an array. In the special case of FIG. 7B, the resultant cross-sections 71a–o constitute a single column of 15 rows. However, in other instances, arbitrary patterns could be produced, which may be useful for purposes of engraving, machining or photolithography, for example. A rearrangement of the beam sections which closely matches the footprint of a circle may also be of interest in some applications.

It should also be appreciated that although the embodiment illustrated in FIG. 6 shows each row of the first reflective facets 62 applying a similar spatial transformation to the input optical beams impinging thereupon, it is within the scope of the present invention to apply a singular transformation to each individual one of the input optical beams 52, with a view to achieving a unique pattern for the cross-sections 71a–o of the output optical beams 74a–o.

Figure 8:
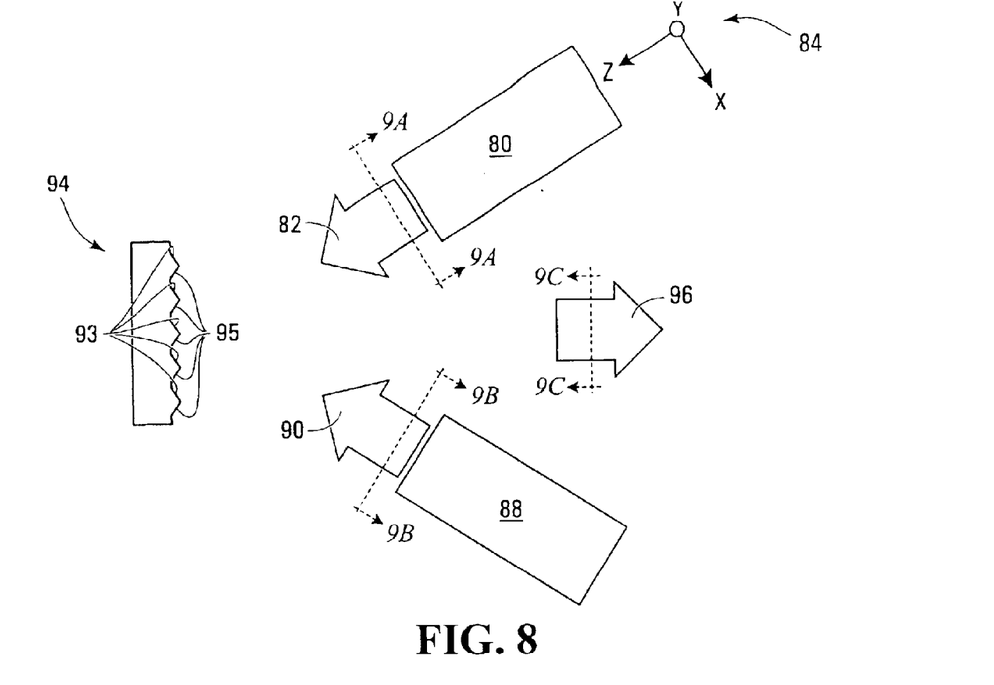
FIG. 8 is a plan view of a mirror configuration for reshaping a first and a second bundle of input optical beams into a bundle of output optical beams, in accordance with another alternative embodiment of the present invention.
Figure 9A:
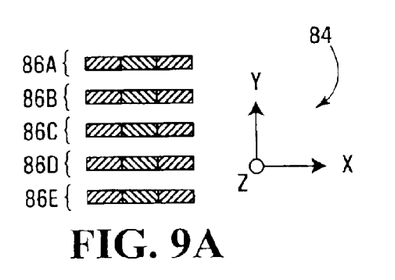
FIG. 9A is a sectional view of the first input optical beam bundle in FIG. 8, taken along the line 9A—9A.

With reference now to FIG. 8, there is shown yet another embodiment of the present invention, in which there is provided a first source 80 of optical beams travelling as a first input optical beam bundle 82 in a common first direction along the x-z plane of a new orthogonal reference system 84. With reference to FIG. 9A, the optical beams in the first input optical beam bundle 82 are arranged into five rows 86a–e of three input optical beams per row, with each of the rows 86a–e occupying a different position in the y-direction of the orthogonal reference system 84. Again, the number of rows and input optical beams per row is arbitrary.

Figure 9B:
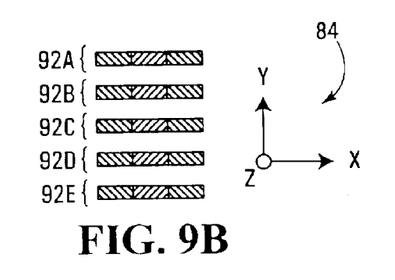
FIG. 9B is a sectional view of the first input optical beam bundle in FIG. 8, taken along the line 9B—9B.

Also provided is a second, independent source 88 of optical beams travelling as a second input optical beam bundle 90 in a common second direction along the x-z plane. The first and second directions along the x-z plane are not collinear, i.e., imaginary planes orthogonal to the first and second directions would intersect. With reference to FIG. 9B, the optical beams in the second input optical beam bundle 90 are also arranged into five rows 92a–e of three input optical beams per row, with each of the rows 92a–e occupying a different position in the y-direction. Of interest is the fact that the positions in the y-direction occupied by the optical beams in the first input optical beam bundle 82 are different from the positions in the y-direction occupied by the optical beams in the second input optical beam bundle 90. In fact, it may be advantageous to interlace the rows 86a–e of the first input optical beam bundle 82 with the rows 92a–e of the second input optical beam bundle 90.

FIG. 8 also provides a mirror configuration 94 at the intersection of the first and second directions of travel. The mirror configuration 94 comprises a plurality of first reflective facets (angled as shown at 93) for deflecting the optical beams in the first input optical beam bundle 82 into a third direction in the x-z plane different from the first and second directions. The mirror configuration also comprises a plurality of second reflective facets (angled as shown at 95) for deflecting the optical beams in the second input optical beam bundle 90 into the same third direction in the x-y plane.

Figure 9C:
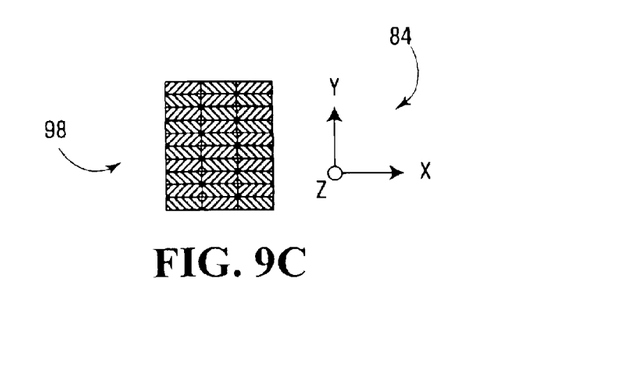
FIG. 9C is a sectional view of the output optical beam bundle in FIG. 8, taken along the line 9C—9C.

In this way, an output optical beam bundle 96 will contain a number of optical beams equal to the sum of the number of beams in the first and second input optical beam bundles 82, 90, and each of the beams in the output optical beam bundle 96 will be travelling in substantially the same direction. The cross-sectional configuration 98 of the output optical beam bundle 96 is shown in FIG. 9C, where it is seen that the positions in the y-direction occupied by the optical beams in the output optical beam bundle 96 will correspond to the union of the positions in the y-direction occupied by the optical beams in the first and second input optical beam bundles. As a result, the cross-sectional configuration 98 of the output optical beam bundle 96 will be more densely occupied than either of the cross-sectional configurations corresponding to the first or second input optical beam bundles 82, 90 taken alone.

Those skilled in the art will appreciate that the increased cross-sectional density of the output optical beam bundle may also be achieved by interlacing the columns of the first input optical beam bundle 82 with the columns of the second input optical beam bundle 90, or by merely ensuring that complementary positions are occupied in the matrices corresponding to the cross-sections of the two input optical beam bundles 82, 90.

Figure 10:
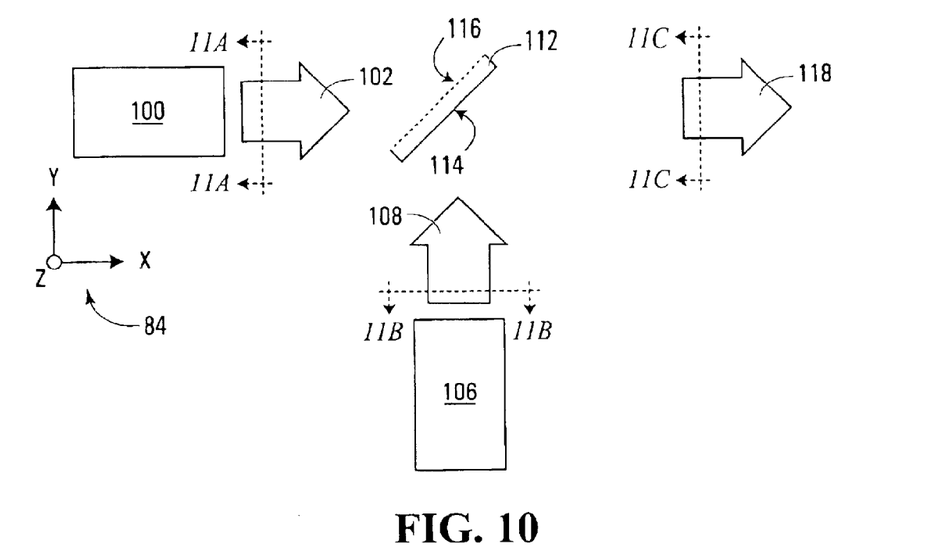
FIG. 10 is a plan view of a mirror configuration for reshaping a first and a second bundle of input optical beams into a bundle of output optical beams, in accordance with yet another alternative embodiment of the present invention.
Figure 11A:
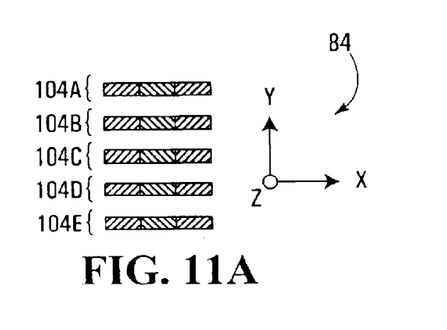
FIG. 11A is a sectional view of the first input optical beam bundle in FIG. 10, taken along the line 11A—11A.

In accordance with yet another embodiment of the present invention, and with additional reference to FIG. 10, there is provided a first source 100 of optical beams travelling as a first input optical beam bundle 102 in a common first direction along the x-z plane of the orthogonal reference system 84. With reference to FIG. 11A, the optical beams in the first input optical beam bundle 102 are arranged into five rows 104a–e of three optical beams per row, with each of the rows 104a–e occupying a different position in the y-direction of the orthogonal reference system 84. Again, the number of rows and input optical beams per row is arbitrary.

Figure 11B:
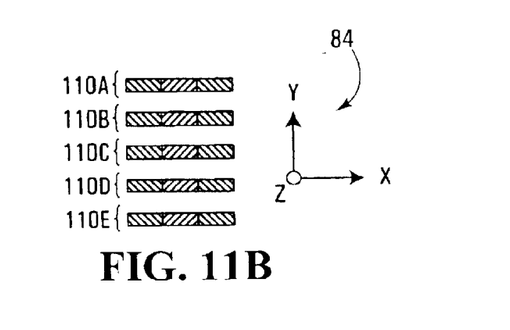
FIG. 11B is a sectional view of the second input optical beam bundle in FIG. 10, taken along the line 11B—11B.

Also provided is a second, independent source 106 of optical beams travelling as a second input optical beam bundle 108 in a common second direction along the x-z plane. The first and second directions of travel are perpendicular to one another. With reference to FIG. 11B, the optical beams in the second input optical beam bundle 108 are arranged into five rows 110a–e of optical beams, with each of the rows 110a–e occupying a different position in the y-direction. Of interest is the fact that the positions in the y-direction occupied by the optical beams in the first input optical beam bundle 102 are different from the positions in the y-direction occupied by the optical beams in the second input optical beam bundle 108. As in the case of the embodiment described herein above with respect to FIG. 8, it may be advantageous to interlace the rows 104a–e of the first input optical beam bundle 102 with the rows 110a–e of the second input optical beam bundle 108.

FIG. 10 also provides an optical device 112 at the intersection of the first and second directions of travel. The optical device 112 comprises a plurality of reflective facets 114 for deflecting the optical beams in the second input optical beam bundle 108 into the second direction, i.e., the direction travelled by the first input optical beam bundle 102. The optical device 112 is further configured to admit the optical beams in the second optical beam bundle such that the second optical beams continue to travel in the second direction in the x-z plane and still occupy the second positions in the y-direction. To this end, the surface 116 on which the first optical beam bundle 102 impinges would be transmissive (e.g., made of glass) and, moreover, the transmissive matter could be composed of layers that form a spacer between rows of the reflective facets 114.

Figure 11C:
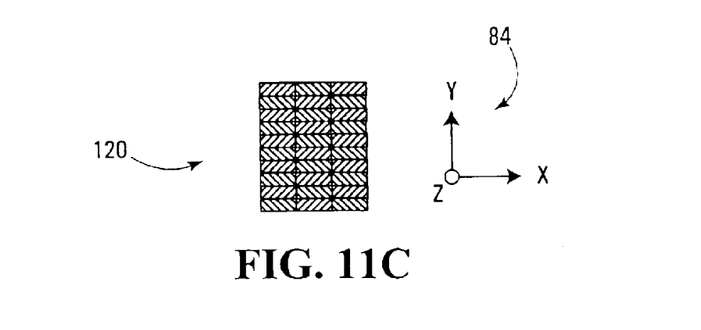
FIG. 11C is a sectional view of the output optical beam bundle in FIG. 10, taken along the line 11C—11C.

In this way, an output optical beam bundle 118 will contain a number of optical beams equal to the sum of the number of beams in the first and second input optical bean bundles 102, 108, and each of the beams in the output optical beam bundle 118 will be travelling in substantially the same direction as the optical beams in the first optical beam bundle 102. Also, the positions in the y-direction occupied by the optical beams in the output optical beam bundle 118 will correspond to the union of the positions in the y-direction occupied by the optical beams in the first and second input optical beam bundles 102, 108. As a result, the cross-sectional pattern 120 of the output optical beam bundle 118 (see FIG. 11C) will be more dense than either of the cross-sectional patterns corresponding to the first or second input optical beam bundles 102, 108.

While specific embodiments of the present invention have been described and illustrated, it will be apparent to those skilled in the art that numerous modifications and variations can be made without departing from the scope of the invention as defined in the appended claims.

What is claimed is:

1. Apparatus for shaping a first optical beam bundle into a second optical beam bundle, the first optical beam bundle carrying a first plurality of substantially parallel optical beams disposed in a common plane of travel, the apparatus comprising:

a plurality of first reflective facets;

the first reflective facets being oriented so as to deflect the optical beams of the first optical beam bundle into a plurality of intermediate, substantially non-parallel optical beams;

a plurality of second reflective facets;
each of the second reflective facets being spatially disposed so as to receive a respective one of the intermediate optical beams at a different respective distance from the plane of travel of the optical beams of the first optical beam bundle;
the second reflective facets being oriented so as to deflect the intermediate optical beams into a second plurality of substantially parallel optical beams, thereby to form the second optical beam bundle.

2. Apparatus as defined in claim 1, the second reflective facets further being spatially disposed so as to cause the optical beams of the second optical beam bundle to be aligned along an imaginary line that is normal to the plane of travel of the optical beams of the first optical beam bundle.

3. Apparatus as defined in claim 1, the first reflective facets being disposed relative to the second reflective facets such that a substantially identical distance is traveled by each of the optical beams of the first optical beam bundle as measured from a first imaginary plane orthogonally intersecting the first optical beam bundle to a second imaginary plane orthogonally intersecting the second optical beam bundle.

4. Apparatus as defined in claim 1, wherein the first reflective facets are disposed relative to the second reflective facets such that no more than 2.5% of a difference exists between the distances traveled by any two of the optical beams of the first optical beam bundle as measured from a first imaginary plane orthogonally intersecting the first optical beam bundle to a second imaginary plane orthogonally intersecting the second optical beam bundle.

5. Apparatus as defined in claim 1, wherein the optical beams forming the first optical beam bundle have substantially common wavelength, and wherein the first reflective facets are disposed relative to the second reflective facets such that the distances traveled by any two of the optical beams of the first optical beam bundle as measured from a first imaginary plane orthogonally intersecting the first optical beam bundle to a second imaginary plane orthogonally intersecting the second optical beam bundle differs by an integral number of wavelengths.

6. Apparatus as defined in claim 1, wherein the plurality of first reflective facets define the outer faces of a monolithic base.

7. Apparatus as defined in claim 6, wherein the monolithic base is a first monolithic base and wherein the plurality of second reflective facets define the outer surfaces of a second monolithic base different from the first monolithic base.

8. Apparatus as defined in claim 1, wherein the plurality of first reflective facets and the plurality of second reflective facets are part of a single integral monolithic base.

9. Apparatus as defined in claim 1, further comprising:
a mechanism for controllably varying the distance traveled by individual ones of the optical beams of the first optical beam bundle as measured from a first imaginary plane orthogonally intersecting the first optical beam bundle to a second imaginary plane orthogonally intersecting the second optical beam bundle.

10. Apparatus as defined in claim 9, wherein said mechanism is piezoelectric.

11. Apparatus as defined in claim 1, wherein the optical beams of the first optical beam bundle travel in a common direction of travel, the apparatus further comprising:
a mechanism for controllably translating the position of the first reflective facets along the direction of travel.

12. Apparatus as defined in claim 11, wherein said mechanism is piezoelectric.

13. Apparatus as defined in claim 1, wherein the optical beams of the first optical beam bundle travel in a common first direction of travel, wherein the optical beams of the second optical beam bundle travel in a common second direction of travel, and wherein the first and second directions of travel are identical.

14. Apparatus as defined in claim 1, wherein the optical beams of the first optical beam bundle travel in a common first direction of travel, wherein the optical beams of the second optical beam bundle travel in a common second direction of travel, and wherein the first and second directions of travel are different.

15. Apparatus as defined in claim 1, wherein the first reflective facets have a curvature to condition the optical beams being deflected by the first reflective facets.

16. Apparatus as defined in claim 15, wherein the second reflective facets have a curvature to condition the optical beams being deflected by the second reflective facets.

17. Apparatus as defined in claim 1, wherein the optical beams of the first optical beam bundle define a first cross-sectional configuration, wherein the optical beams of the second optical bean bundle define a second cross-sectional configuration, and wherein the first and second cross-sectional configurations are different.

18. Apparatus as defined in claim 17, wherein the second cross-sectional configuration approximates a circle.

19. Apparatus as defined in claim 17, wherein the second configuration is more densely occupied than the first configuration.

20. Apparatus for shaping a first optical beam bundle into a second optical beam bundle, the first optical beam bundle carrying a plurality of sets of substantially parallel optical beams, wherein the optical beams of each of the sets of optical beams of the first optical beam bundle are commonly disposed in a corresponding one of a plurality of substantially parallel planes of travel, the apparatus comprising:
a plurality of sets of first reflective facets;
the first reflective facets in each set of first reflective facets being oriented so as to deflect the optical beams of a corresponding one of the sets of optical beams of the first optical beam bundle into a corresponding set of intermediate, substantially nonparallel optical beans;
a plurality of second reflective facets;
each of the second reflective facets being spatially disposed so as to receive a respective one of the intermediate optical beams at a different respective distance from the planes of travel of the optical beams of the first optical beam bundle;
the second reflective facets being oriented so as to deflect the intermediate optical beams into a second plurality of substantially parallel optical beams, thereby to form the second optical beam bundle.

21. Apparatus as defined in claim 20, wherein the optical beams of the first optical beam bundle define a first cross-sectional configuration, wherein the optical beams of the second optical beam bundle define a second cross-sectional configuration, and wherein the first and second cross-sectional configurations are different.

22. Apparatus as defined in claim 21, wherein the second cross-sectional configuration approximates a circle.

23. Apparatus as defined in claim 21, wherein the first configuration comprises an array of N rows and M columns of sectional elements corresponding to the optical beams of the first optical beam bundle and wherein the second configuration comprises a pattern having (N×M) sectional elements arranged differently from the array of N rows and M columns.

24. Apparatus as defined in claim 21, wherein the first configuration comprises an array of N rows and M columns of sectional elements corresponding to the optical beams of the first optical beam bundle and wherein the second configuration comprises a column of (N×M) rows of sectional elements.

25. Apparatus as defined in claim 21, the second reflective facets further being spatially disposed so as to cause the optical beams of the second optical beam bundle to be aligned along an imaginary line that is normal to each of the planes of travel of the optical beams of the first optical beam bundle.

26. Apparatus as defined in claim 21, wherein the first configuration comprises a pattern of spaced apart sectional elements corresponding to the optical beams of the first optical beam bundle and wherein the second configuration comprises a pattern of contiguous sectional elements corresponding to the optical beams of the second optical beam bundle.

27. Apparatus comprising:
an optical source adapted to emit a plurality of optical beams substantially in a z-direction of an x-y-z orthogonal reference system and parallel to an x-z plane of the orthogonal reference system;
a mirror configuration disposed at a position in the z-direction so as to receive the optical beams emitted by the optical source;
the mirror configuration comprising:
a plurality of first reflective facets;
the first reflective facets being oriented so as to deflect the optical beams received from the optical source into a plurality of intermediate, substantially non-parallel optical beams;
a plurality of second reflective facets;
each of the second reflective facets being spatially disposed so as to receive a respective one of the intermediate optical beams at a different position in the y-direction of the orthogonal reference system;
the second reflective facets being oriented so as to deflect the intermediate optical beams into an outgoing plurality of substantially parallel optical beams.

28. Apparatus as defined in claim 27, wherein the optical beams emitted by the source are divergent in the x-direction of the orthogonal reference system and wherein the first reflective facets are disposed at positions in the z-direction prior to overlap of any pair of the optical beams emitted by the optical source as a result of divergence in the x-direction.

29. Apparatus as defined in claim 28, wherein the optical source comprises:
an emitter for emitting a plurality of source beamlets; and
means for parallelizing the plurality of source beamlets to create the plurality of optical beams emitted by the optical source.

30. Apparatus as defined in claim 29, wherein the means for parallelizing is selected from the group consisting of a collimator, a diffraction grating and a curved mirror.

31. Apparatus as defined in claim 29, wherein the emitter is a laser diode bar.

32. Apparatus as defined in claim 29, wherein the emitter comprises a plurality of emitting areas distributed along the x-direction and wherein each of the emitters produces a corresponding one of the source beamlets.

33. Apparatus as defined in claim 32, wherein each of the emitting areas spans substantially the same distance in the x-direction.

34. Apparatus as defined in claim 33, wherein each of the optical beams emitted by the optical source originates from a corresponding one of the source beamlets.

35. Apparatus as defined in claim 33, wherein at least one of the optical beams emitted by the optical source originates from a combination of at least two of the source beamlets.

36. Apparatus as defined in claim 32, wherein at least two of the emitting areas span substantially different distances in the x-direction.

37. Apparatus as defined in claim 36, wherein each of the optical beams emitted by the optical source originates from a corresponding one of the source beamlets.

38. Apparatus as defined in claim 36, wherein at least one of the optical beams emitted by the optical source originates from a combination of at least two of the source beamlets.

39. Apparatus as defined in claim 32, wherein each of the emitting areas extends substantially the same distance in the y-direction.

40. Apparatus as defined in claim 27, wherein the outgoing plurality of optical beams is characterized by a cross-sectional density that is superior to the cross-sectional density of the plurality of optical beams emitted by the optical source.

41. Apparatus as defined in claim 40, wherein the optical source is a laser diode array.

42. A method for shaping a first optical beam bundle into a second optical beam bundle, the first optical beam bundle carrying a first plurality of substantially parallel optical beams disposed in a common plane of travel, the method comprising:
deflecting the optical beams of the first optical beam bundle into a plurality of intermediate, substantially non-parallel optical beams;
intercepting each of the intermediate optical beams at a different respective distance from the plane of travel of the optical beams of the first optical beam bundle;
deflecting the intermediate optical beams into a second plurality of substantially parallel optical beams, thereby to form the second optical beam bundle.

43. An apparatus, comprising:
a source of first optical beams travelling in a common first direction parallel to an x-z plane of an x-y-z orthogonal reference system and occupying a plurality of first positions in a y-direction of the orthogonal reference system;
a source of second optical beams travelling in a common second direction parallel to the x-z plane and occupying a plurality of second positions in the y-direction;
the first and second directions being non-collinear;
the first positions in the y-direction being different from the second positions in the y-direction;
a mirror configuration comprising:
a first reflective area for deflecting the first optical beams into a third direction parallel to the x-z plane and different from the first and second directions;
a second reflective area for deflecting the second optical beams into the third direction.

44. Apparatus as defined in claim 43, wherein the first reflective area and the second reflective area are integrated to a common base.

45. Apparatus as defined in claim 43, wherein the first reflective area comprises a plurality of commonly oriented first reflective facets and wherein the second reflective area comprises a plurality of commonly oriented second reflective facets, wherein the first reflective facets are differently oriented from the second reflective facets.

46. Apparatus as defined in claim 43, wherein the first positions in the y-direction are interlaced with the second positions in the y-direction.

47. Apparatus as defined in claim 45, wherein the plurality of first reflective facets are oriented so as to cause the deflected first optical beams to continue to occupy the first positions in the y-direction and wherein the plurality of second reflective facets are oriented so as to cause the deflected second optical beams to continue to occupy the second positions in the y-direction.

48. An apparatus, comprising:

a source of first optical beams travelling in a common first direction parallel to an x-z plane of an x-y-z orthogonal reference system and occupying a plurality of first positions in a y-direction of the orthogonal reference system;

a source of second optical beams travelling in a common second direction parallel to the x-z plane and occupying a plurality of second positions in the y-direction;

the first direction being perpendicular to the second direction;

the first positions in the y-direction being different from the second positions in the y-direction;

an optical device comprising:

a plurality of reflective facets for deflecting the first optical beams into the second direction such that the deflected first optical beams continue to occupy the first positions in the y-direction;

the optical device being configured to allow through passage of the second optical beams such that the second optical beams continue to travel in the second direction and continue to occupy the second positions in the y-direction.

49. Apparatus as defined in claim 48, wherein the first positions in the y-direction are interlaced with the second positions in the y-direction.

* * * * *